(12) United States Patent
Chae et al.

(10) Patent No.: US 8,268,214 B2
(45) Date of Patent: Sep. 18, 2012

(54) SOFT MOLD AND METHOD FOR FABRICATING THE SAME

(75) Inventors: Gee Sung Chae, Incheon-kwangyokshi (KR); Gyoo Chul Jo, Gunpo-si (KR); Jin Wuk Kim, Ulwang-si (KR); Chang Hee Lee, Hwaseong-si (KR)

(73) Assignee: LG Display Co., Ltd., Seoul (KR)

( * ) Notice: Subject to any disclaimer, the term of this patent is extended or adjusted under 35 U.S.C. 154(b) by 961 days.

(21) Appl. No.: 11/314,637

(22) Filed: Dec. 20, 2005

(65) Prior Publication Data

US 2006/0290025 A1    Dec. 28, 2006

(30) Foreign Application Priority Data

Jun. 24, 2005   (KR) .................. 10-2005-0055192

(51) Int. Cl.
*B29C 33/40* (2006.01)
(52) U.S. Cl. ......... 264/226; 264/220; 264/225; 264/227
(58) Field of Classification Search .................. 264/225, 264/220, 226, 227
See application file for complete search history.

(56) References Cited

U.S. PATENT DOCUMENTS

| 7,194,170 B2 * | 3/2007 | Biegelsen ..................... 385/116 |
| 2003/0210367 A1 * | 11/2003 | Nakano et al. ................. 349/113 |
| 2007/0138691 A1 * | 6/2007 | Sugimoto ..................... 264/219 |

FOREIGN PATENT DOCUMENTS

| EP | 0 950 502 A2 | 10/1999 |
| JP | H11-300838 | 11/1999 |
| JP | 2005-066836 | 3/2005 |
| KR | 10-2004-0088977 | 10/2004 |
| WO | WO 2004090636 A1 * | 10/2004 |

OTHER PUBLICATIONS

About.com definition for "High Polymer" see webpage at http://composite.about.com/library/glossary/h/bldef-h2635.htm?p=1.*
First Office Action issued in corresponding Chinese Patent Application No. 2005101275229; issued Apr. 25, 2008.
Office Action issued in corresponding Korean Patent Application No. 10-2005-0055192, mailed Dec. 19, 2011.

* cited by examiner

*Primary Examiner* — Yogendra Gupta
*Assistant Examiner* — Amjad Abraham
(74) *Attorney, Agent, or Firm* — Brinks Hofer Gilson & Lione

(57) ABSTRACT

A soft mold and a method for fabricating the same are disclosed. A master mold that has a pattern on a substrate is first formed. A first liquid high polymer precursor is formed on the master mold and then partially cured. A support film having high UV transmittance is attached to the partially cured high polymer. The attached support film and the partially cured high polymer are treated with a coupling agent and a second liquid high polymer precursor is formed on the partially cured high polymer and the support film. The second liquid high polymer precursor and the partially cured high polymer are then fully cured to form a mold. The fully cured mold is stripped from the master mold to form a soft mold having a predetermined shape on one surface.

19 Claims, 4 Drawing Sheets

SOFT MOLD AND METHOD FOR FABRICATING THE SAME

This application claims the benefit of the Korean Patent Application No. P2005-0055192, filed on Jun. 24, 2005, which is hereby incorporated by reference as if fully set forth herein.

TECHNICAL FIELD

The present invention relates to a soft mold for a fine pattern, and more particularly, to a soft mold and a method for fabricating the same, in which a support film is provided to improve durability.

DISCUSSION OF THE RELATED ART

Generally, a soft mold is fabricated by casting rubber (liquid high polymer precursor) in a mold such that the mold has a pattern. The soft mold is used to form the inverted pattern on a substrate using a particular material. For example, the soft mold is used to form either a color filter on a color filter substrate of a liquid crystal display device or an electrode in an organic electroluminescent (EL) device.

Hereinafter, a related art process for fabricating a soft mold will be described with reference to the accompanying drawings. FIG. 1A to FIG. 1C are sectional views illustrating related art process steps of fabricating a soft mold.

As shown in FIG. 1A, a master mold A is prepared to create a predetermined shape on a surface of a soft mold. The master mold A is formed by depositing an insulating material on an insulating substrate 10 to form a preceding layer. The preceding layer is then patterned by a photolithographic process to form a desired pattern 12.

As shown in FIG. 1B, once the master mold A is completed, an elastic polymer (elastic rubber) solution of a pre-polymer state is cast on the master mold A to form a pre-polymer layer 14.

Next, as shown in FIG. 1C, a polymer layer in which the pre-polymer layer 14 is completely cured is referred to as a soft mold 16. The soft mold 16 is stripped from the master mold ('A' of FIG. 1B) so that the soft mold having a predetermined shape on its surface is fabricated.

The soft mold fabricated as above is used in various fields of soft lithography, soft molding, capillary force lithography, and in-plane printing. For mass production of a product based on the soft mold used in various fields, it is desirable that the soft mold be aligned consistently. That is, it is desirable for the material of the soft mold to retain its shape without contraction or expansion even after the material is used several times. However, the soft mold formed in a single structure as above contracts or expands due to deformation if it is used several times. For this reason, it is difficult to exactly align the soft mold.

SUMMARY

By way of introduction only, a soft mold in one embodiment includes a support film and a mold surrounding the support film. The support film has UV transmittance of about 95% or greater. The mold has a surface containing a pattern.

In another embodiment, a method of fabricating a soft mold is provided. A first mold material is formed on a master mold, which has a pattern on a substrate. The first mold material is partially cured and a support film is attached to the partially cured first mold material. A second mold material is formed on the partially cured first mold material and the support film. The second mold material and the partially cured first mold material are then fully cured to form a soft mold. The soft mold is stripped from the master mold. A surface of the stripped soft mold has an inverse of the pattern.

In another embodiment, a method of forming a pattern on a substrate is presented. A layer to be patterned is deposited on the substrate. A soft mold contacts the layer. The soft mold includes a mold that contains a support film having UV transmittance of about 95% or greater disposed therein. A surface of the soft mold that contacts the layer contains an inverse of the pattern. The layer and the soft mold are then separated.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A soft mold and a method for fabricating the same according to the preferred embodiment of the present invention will be described with reference to the accompanying drawings.

Figure 1A:
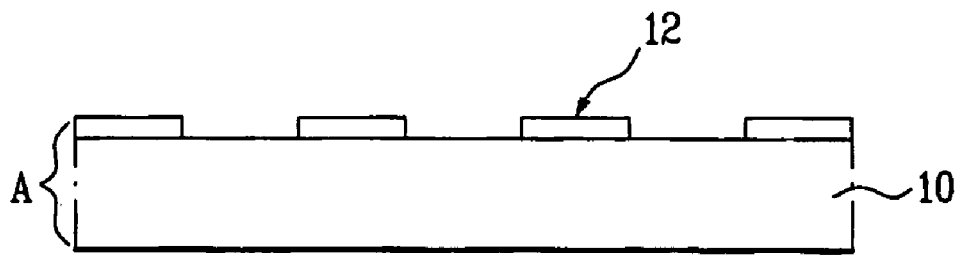
FIG. 1A to FIG. 1C are sectional views illustrating related art process steps of fabricating a soft mold.
Figure 1B:
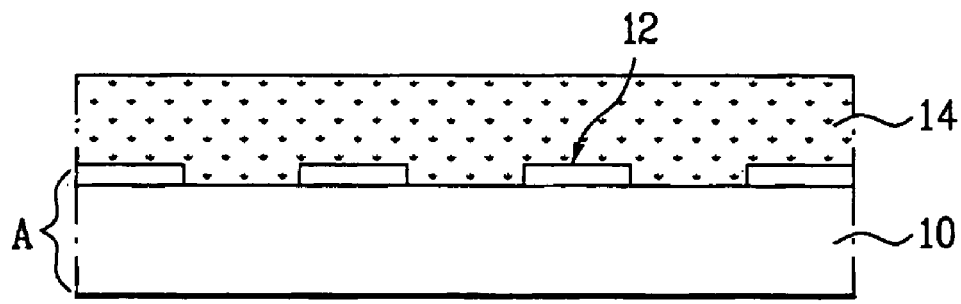
Figure 1C:
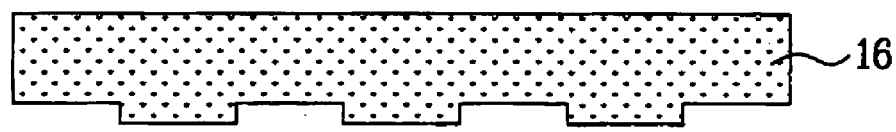
Figure 2:
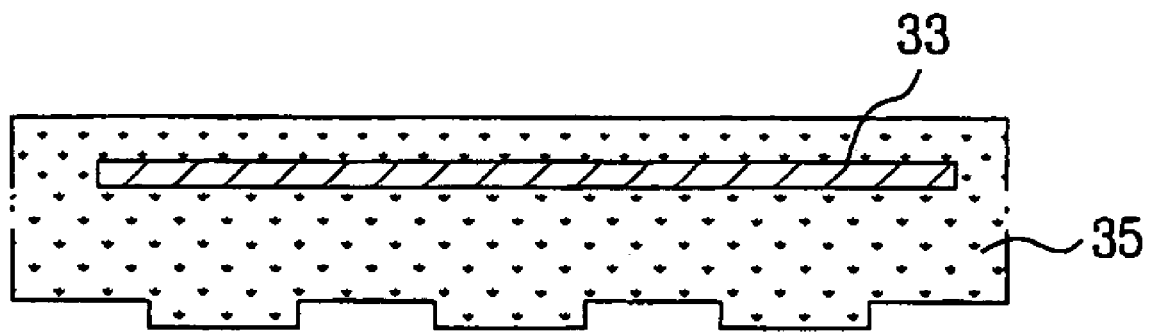
FIG. 2 is a structural sectional view illustrating a soft mold according to the present invention.

First, a soft mold according to the embodiment of the present invention will be described. FIG. 2 is a structural sectional view illustrating a soft mold according to the present invention.

As shown in FIG. 2, the soft mold according to the present invention includes a support film 33 having high UV transmittance, and a mold 35 surrounding the support film 33. The mold 35 has an uneven lower surface containing a predetermined pattern and a substantially flat upper surface. The support film 33 is formed using one or more two-way sheets having a uniform thickness.

A fully cured high polymer is used as the mold 35. The mold 35 can be fabricated by curing an elastic polymer. PDMS is widely used as the elastic polymer, although other materials such as polyurethane or polyimide (or a combination thereof) may be used. More specifically, in one embodiment, the mold 35 is formed by curing an elastic polymer solution. The elastic polymer solution in one embodiment is a mixture of a pre-polymer with a curing agent at a ratio of 10:1.

In one embodiment, the soft mold is formed by inserting the support film 33 into the mold 35. This prevents the mold 35 from being deformed (e.g. contracting or expanding) during formation and/or use. The support film 33 has an ultraviolet (UV) transmittance of about 95% or greater and is arranged in the mold 35 substantially parallel with the planar upper surface of the mold 35. The high amount of UV transmittance of the support film 33 permits UV irradiation of a fine pattern formed on a substrate using the completed soft mold through the soft mold.

A method for fabricating the aforementioned soft mold according to the embodiment of the present invention will now be described. FIG. 3A to FIG. 3F are sectional views illustrating process steps of fabricating a soft mold according to the first embodiment of the present invention.

Figure 3A:
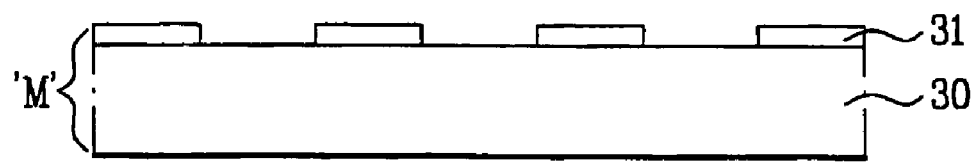
FIG. 3A to FIG. 3F are sectional views illustrating process steps of fabricating a soft mold according to the embodiment of the present invention.

First, as shown in FIG. 3A, a master mold M is prepared to form a predetermined shape on a surface of a soft mold. The master mold M is formed by depositing an insulating material on an insulating substrate 30 such as a silicon substrate or a glass substrate to form a preceding layer. The preceding layer is patterned by a photolithographic process to form a desired pattern 31. The pattern 31 on the substrate 30 may be formed of an inorganic material such as $Si_3N_4$, $SiO_2$, a metal, photoresist, or wax.

Figure 3B:
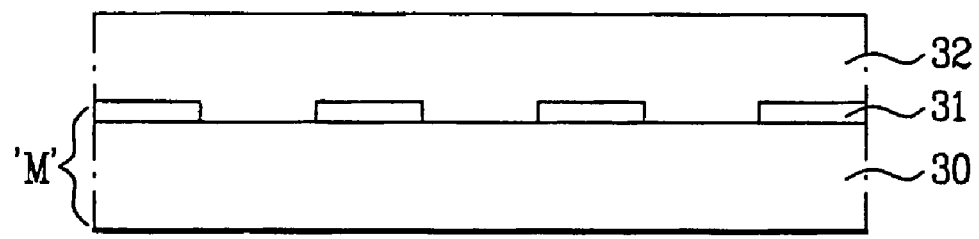

As shown in FIG. 3B, when the master mold M is completed, an elastic polymer (elastic rubber) of a pre-polymer state or a high polymer material equivalent to the elastic polymer is cast on the master mold M to form a first liquid high polymer precursor 32. The elastic polymer may be formed of PDMS, polyurethane, and/or polyimide. The first liquid high polymer precursor 32 has a thickness of about 0.5 mm to 3 mm, for example about 1 mm. Note that the about prefacing all ranges pertains to both the first and last value. Thus, in the above example, the thickness of the first liquid high polymer precursor 32 extends from about 0.5 mm to about 3 mm.

A mixture of pre-polymer with a curing agent at a mixture ratio of 10:1 is used as the elastic polymer solution of the pre-polymer state. Other mixture ratios such as 1:1 may be used depending on the material of the elastic polymer.

Subsequently, the first liquid high polymer precursor 32 is partially cured. More specifically, the first liquid high polymer precursor 32 may be cured for about two hours to two days at a temperature of about 25° C. For example, the first liquid high polymer precursor 32 may be cured for about one day at a temperature of about 25° C.

Figure 3C:
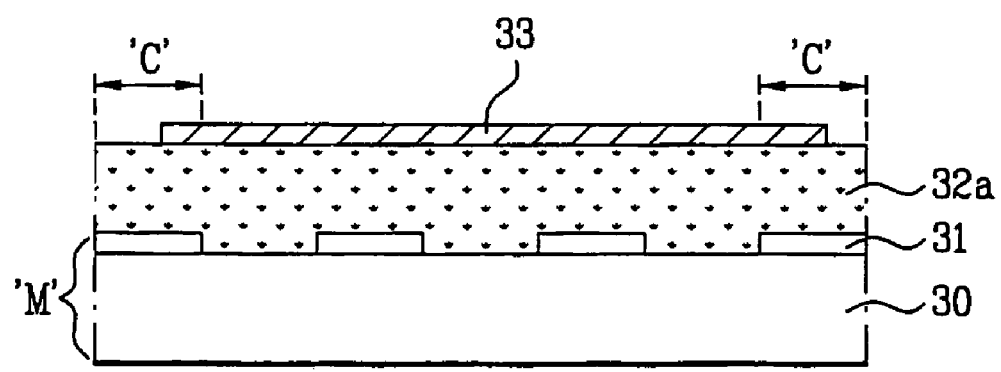

Next, as shown in FIG. 3C, the support film 33 is attached to the partially cured high polymer 32a. Care is taken to avoid forming bubbles in the partially cured high polymer 32a underneath the support film 33 when depositing the support film 33. The support film 33 may contain PET and have a thickness of about 0.1 mm to 1 mm. In addition, the support film 33 has UV transmittance of about 95% or greater. Alternatively, other films having UV transmittance of about 95% or greater may be used as the support film.

When the support film 33 is fixed to the partially cured high polymer 32a, the support film 33 is pushed by a rubber roller. This improves the adhesion and helps to remove bubbles formed between the support film 33 and the partially cured high polymer 32a.

Subsequently, the contour of the support film 33 and the corner (portion defined by 'C') of the partially cured high polymer 32a are treated with a coupling agent. The coupling agent treatment improves adhesion between the partially cured high polymer 32a and a second liquid high polymer precursor 34 (shown in FIG. 3D). The coupling agent treatment also aids in fixing the support film 33 to the partially cured high polymer 32a. The coupling agent treatment is performed using a primer. The coupling agent may also be applied to the partially cured high polymer 32a before the support film 33 is fixed to the partially cured high polymer 32a.

Figure 3D:
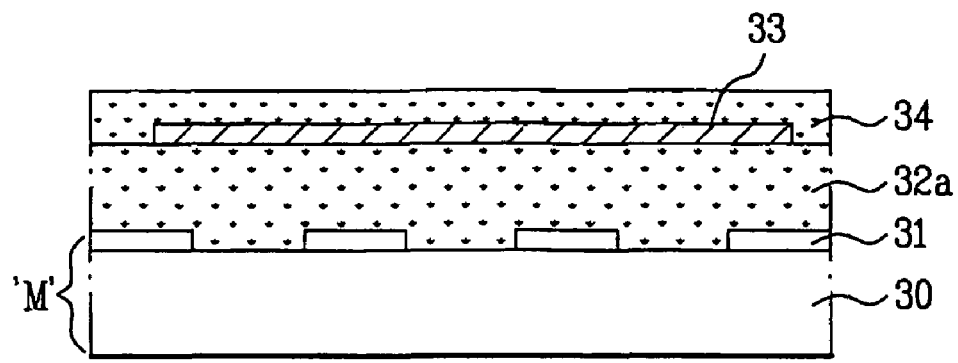

After providing the coupling agent treatment, as shown in FIG. 3D, the second liquid high polymer precursor 34 is cast on the partially cured high polymer 32a including the support film 33. The second liquid high polymer precursor 34 may have a thickness of about 1 mm to 3 mm, e.g. about 2 mm. The first and second liquid high polymer precursors 32, 34 may comprise the same or different materials.

Figure 3E:
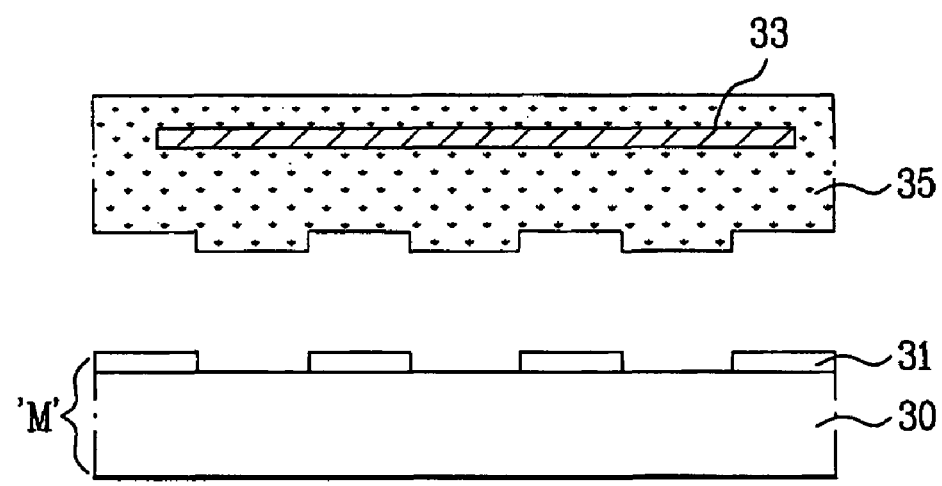

Next, as shown in FIG. 3E, the second liquid high polymer precursor 34 and the partially cured high polymer 32a are fully cured to form a mold 35. This curing process is performed for about one day to ten days, e.g. about seven days, at a temperature of about 25° C. Alternatively, the curing process may be performed for about one hour at a temperature of about 80° C. However, in this latter case, the mold is more liable to become deformed. In addition, the second liquid high polymer precursor 34 and the partially cured high polymer 32a may be fully cured using UV irradiation in addition to/instead of temperature curing. In this case, as the support film 33 has high UV transmittance, UV radiation can be delivered throughout the structure being cured, e.g. to the material of the mold through the support film 33.

Figure 3F:
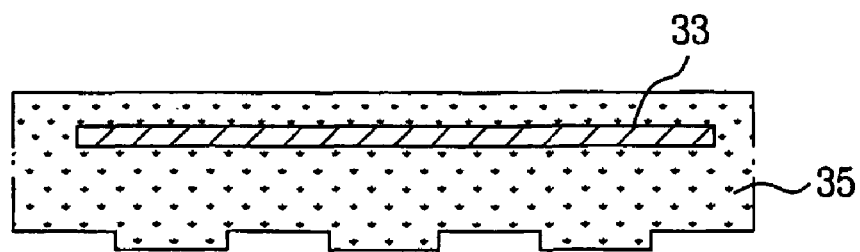

Then, as shown in FIG. 3F, the mold 35 containing the support film 33 is stripped from the master mold M. Thus, the soft mold is created with a predetermined shape on one surface.

Soft molds having a support film and soft molds without a support film were fabricated as described above. The soft molds underwent soft lithography to measure deformation of the mold. The results are shown in Table 1.

TABLE 1

| Type of mold | Deformation of mold |
| --- | --- |
| Support film not inserted | 10,000 ± 1,000 ppm |
| Support film inserted | 212 ± 8 ppm |

As shown in Table 1, the mold deforms (e.g. contracts/expands) less during use if the support film is inserted into the mold than if the support film is not inserted into the mold. The ratio of the amount of deformation is about 50:1 for a mold that does not have a support film to a mold that contains a support film.

Thus, since the support film is inserted into the mold, deformation of the mold can be decreased and thereby durability of the mold can be improved. Accordingly, the mold is more suitable for mass production as the durability increases.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for fabricating a soft mold, the method comprising:
   forming a first mold material on a master mold, the master mold having a pattern on a substrate;
   partially curing the first mold material;
   attaching a support film to the partially cured first mold material, wherein the support film is smaller than that of the partially cured first mold material, so that a middle portion of a top surface of the partially cured first mold material is in contact with a bottom surface of the support film, and a corner portion of the top surface of the partially cured first mold material is out of contact with the bottom surface of the support film, and has a different height from a top surface of the support film as much as a thickness of the support film;

fixing the support film to the partially cured first mold material by pushing the support film using a rubber roller;

treating the corner portion of the top surface of the partially cured first mold material and a contour of the support film, including a corner portion of the top surface of the support film and side surface of the support film, with a coupling agent before fixing the support film to the partially cured first mold material;

forming a second mold material on the corner portion of the top surface of the partially cured first mold material and the top and the side surfaces of the support film;

fully curing the second mold material and the partially cured first mold material to form a soft mold; and stripping the soft mold from the master mold after fully curing the second mold material, the stripped soft mold having an inverse of the pattern on a surface, wherein the thickness of the support film is about 0.1 mm to 1 mm, wherein the support film is buried in the soft mold.

2. The method as claimed in claim 1, wherein the support film has UV transmittance of about 95% or greater.

3. The method as claimed in claim 1, wherein treating the top surface of the support film and the surface corner portions is performed using a primer.

4. The method as claimed in claim 1, wherein the first mold material is formed by casting an elastic polymer (elastic rubber) solution of a pre-polymer state or a high polymer material equivalent to the elastic polymer solution.

5. The method as claimed in claim 4, wherein the elastic polymer solution comprises at least one of PDMS, polyurethane, or polyimide.

6. The method as claimed in claim 4, wherein the elastic polymer solution comprises a mixture of pre-polymer and a curing agent at a ratio of 10:1.

7. The method as claimed in claim 1, wherein the partially cured first mold material has a thickness of about 0.5 mm to 3 mm.

8. The method as claimed in claim 1, wherein the first mold material is partially cured for about two hours to two days at a temperature of about 25° C.

9. The method as claimed in claim 1, wherein the support film comprises a PET film.

10. The method as claimed in claim 1, wherein the second mold material has a thickness of about 1 mm to 3 mm.

11. The method as claimed in claim 1, wherein the second mold material and the partially cured first mold material are fully cured for about one day to ten days at a temperature of about 25° C. or for about one hour at a temperature of about 80° C.

12. A method of forming a pattern on a substrate, the method comprising:

depositing a layer to be patterned on the substrate;
forming a soft mold;
contacting the layer with a soft mold, the soft mold including a mold that contains a support film having UV transmittance of about 95% or greater disposed therein, a surface of the soft mold contacting the layer containing an inverse of the pattern; and
separating the layer and the soft mold, wherein forming a soft mold further includes:
forming a first mold material on a master mold, the master mold having a pattern on a substrate;
partially curing the first mold material;
attaching the support film to the partially cured first mold material, wherein the support film is smaller than that of the partially cured first mold material, so that a middle portion of a top surface of the partially cured first mold material is in contact with a bottom surface of the support film, and a corner portion of the top surface of the partially cured first mold material is out of contact with the bottom surface of the support film, and has a different height from a top surface of the support film as much as a thickness of the support film;
fixing the support film to the partially cured first mold material by pushing the support film using a rubber roller;
treating the corner portion of the top surface of the partially cured first mold material and a contour of the support film, including a corner portion of the top surface of the support film and side surface of the support film, with a coupling agent before fixing the support film to the partially cured first mold material;
forming a second mold material on the corner portion of the top surface of the partially cured first mold material and the top and the side surfaces of the support film;
fully curing the second mold material and the partially cured first mold material to form a soft mold; and
stripping the soft mold from the master mold after fully curing the second mold material, the stripped soft mold having an inverse of the pattern on a surface, wherein the thickness of the support film is about 0.1 mm to 1 mm, wherein the support film is buried in the soft mold.

13. The method as claimed in claim 12, wherein the soft mold has a thickness of about 1.5 mm to 6 mm.

14. The method as claimed in claim 12, wherein the soft mold comprises a fully cured elastic polymer or a high polymer equivalent to the fully cured elastic polymer.

15. The method as claimed in claim 12, wherein the soft mold comprises at least one of PDMS, polyurethane, or polyimide.

16. The method as claimed in claim 12, wherein the support film comprises a PET film having a thickness of about 0.1 mm to 1 mm.

17. The method as claimed in claim 12, wherein the substrate is a liquid crystal display device substrate.

18. The method as claimed in claim 12, wherein the substrate is organic electroluminescent (EL) device.

19. A method for fabricating a soft mold, the method comprising:

forming a first mold material on a master mold, wherein the master mold has a pattern on a substrate;
partially curing the first mold material;
placing a support film on a top surface of the partially cured first mold material, wherein the support film is smaller than that of the partially cured first mold material, so that a middle portion of a top surface of the partially cured first mold material is in contact with a bottom surface of the support film, and a corner portion of the top surface of the partially cured first mold material is out of contact with the bottom surface of the support film, and has a different height from a top surface of the support film as much as a thickness of the support film;
adhering the support film on the top surface of the partially cured first mold material by applying pressure to the support film using a rubber roller, so as to improve the adhesion between the support film and the partially cured first mold material, and to remove bubbles formed between the support film and the partially cured first mold material;

treating the corner portion of the top surface of the partially cured first mold material and a contour of the support film, including a corner portion of the top surface of the support film and side surface of the support film, with a coupling agent before adhering the support film on the top surface of the partially cured first mold material;

forming a second mold material on the corner portion of the top surface of the partially cured first mold material and the top and the side surfaces of the support film;

fully curing the second mold material and the partially cured first mold material to form a soft mold; and stripping the soft mold from the master mold, the stripped soft mold having an inverse of the pattern on a surface thereof, wherein the support film is contained within a volume of the soft mold, wherein the thickness of the support film is about 0.1 mm to 1 mm.

* * * * *